United States Patent
Dearman

[11] Patent Number: 5,315,762
[45] Date of Patent: May 31, 1994

[54] GRASS TRIMMING SHEARS

[76] Inventor: Timothy C. Dearman, 13015 Stone Rd., Pearland, Tex. 77581

[21] Appl. No.: 14,317
[22] Filed: Feb. 5, 1993
[51] Int. Cl.⁵ .............................................. B26B 13/00
[52] U.S. Cl. ......................................... 30/231; 30/249
[58] Field of Search ................. 30/231, 232, 244, 248, 30/249, 250, 251, 252, 296.1; 403/407.1, 83, 347, 380

[56] References Cited

U.S. PATENT DOCUMENTS

| | | | |
|---|---|---|---|
| 1,727,067 | 9/1929 | Keefe | 30/251 |
| 1,799,624 | 4/1931 | Goodwin | 30/248 |
| 3,384,962 | 5/1968 | Duffy et al. | 30/251 |
| 4,364,435 | 12/1982 | Tuggle et al. | 30/296.1 |

Primary Examiner—Richard K. Seidel
Assistant Examiner—Hwei-Siu Payer
Attorney, Agent, or Firm—Learman & McCulloch

[57] ABSTRACT

A grass shearing tool has an elongate extension arm connected to a base which in turn supports a grass shearing mechanism. A first lever is pivotally mounted on the base and connected to an upper pivotal blade of a shearing mechanism. A remote actuating lever is mounted pivotally on the extension arm and coupled to the first lever by a connecting rod to enable a user to operate the shearing mechanism while standing upright.

10 Claims, 3 Drawing Sheets

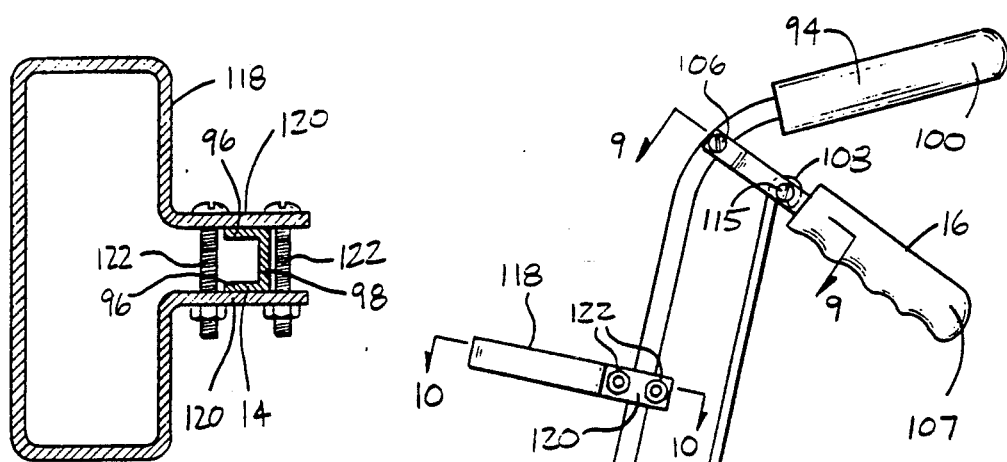
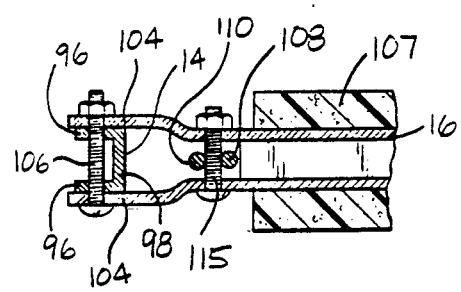
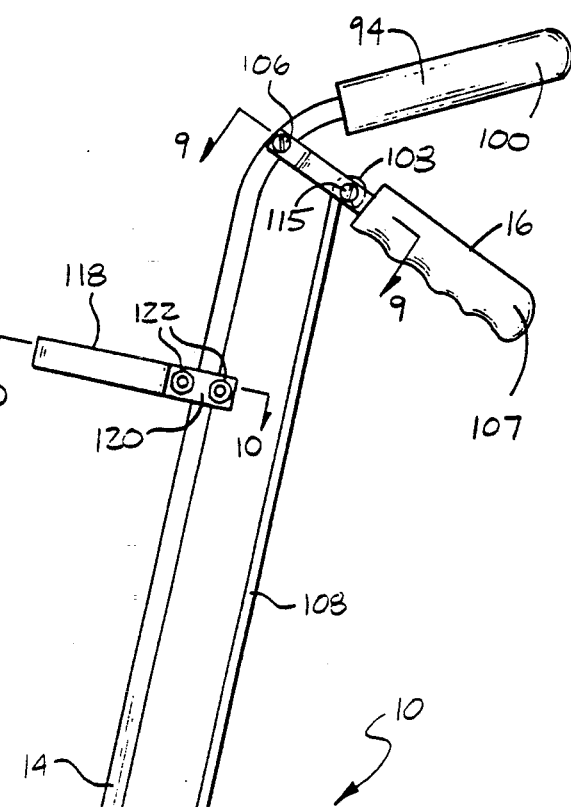
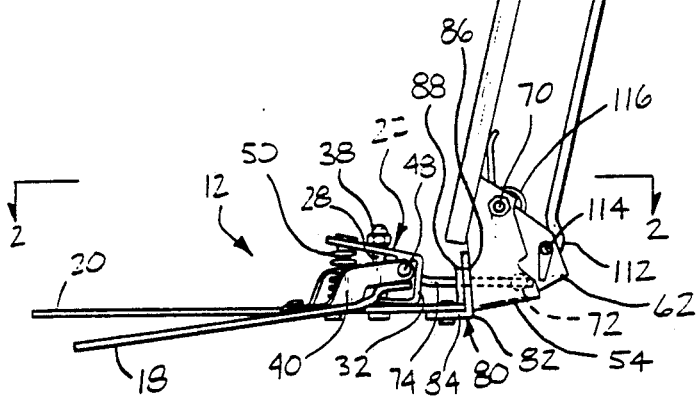

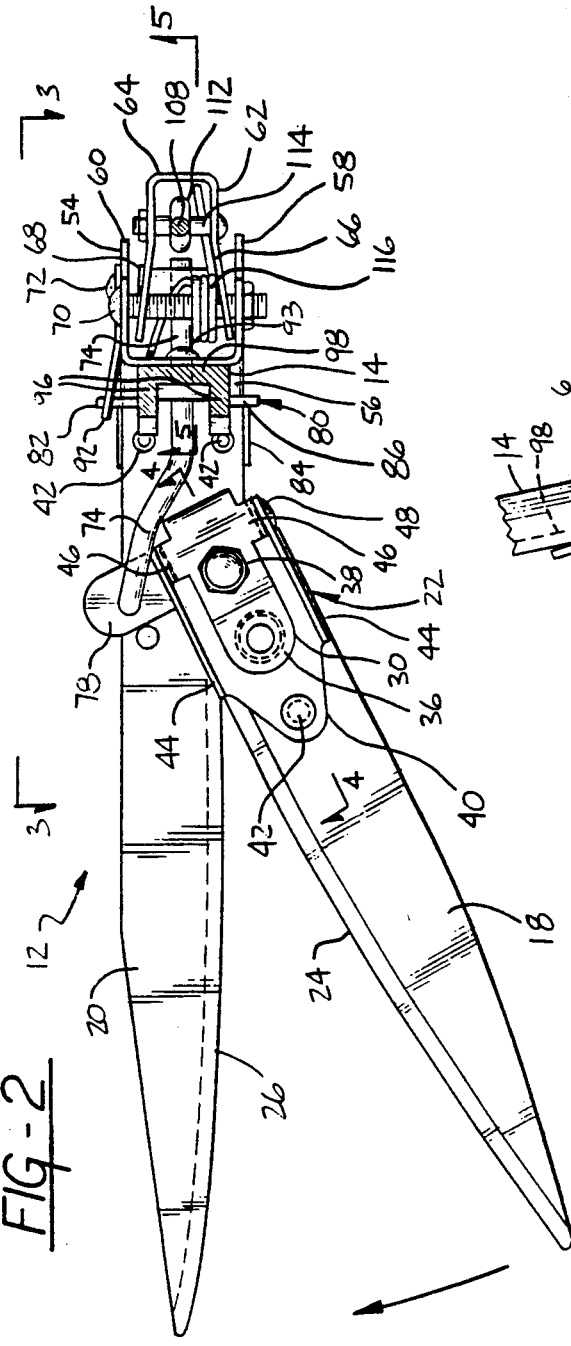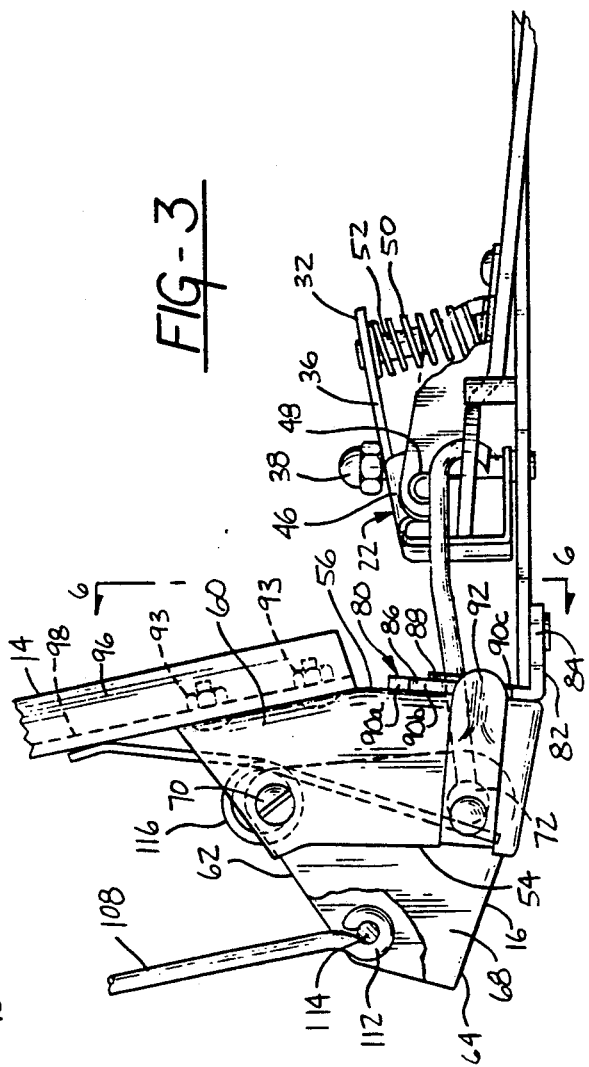

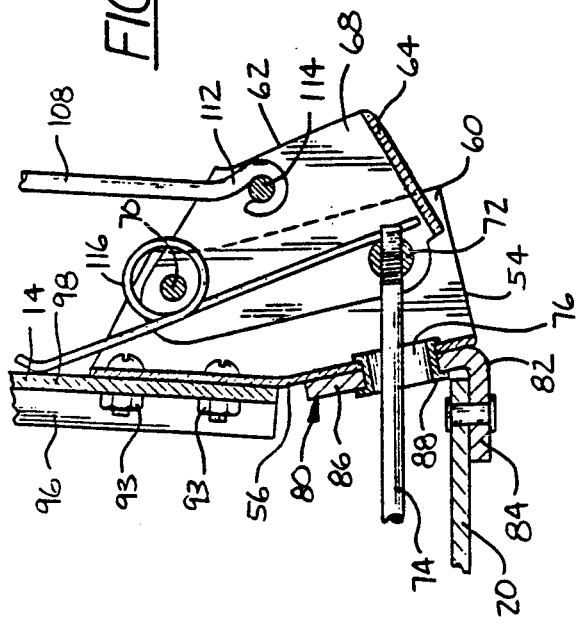
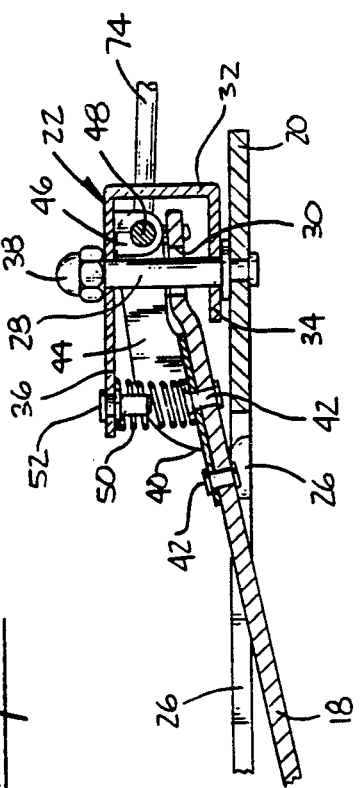
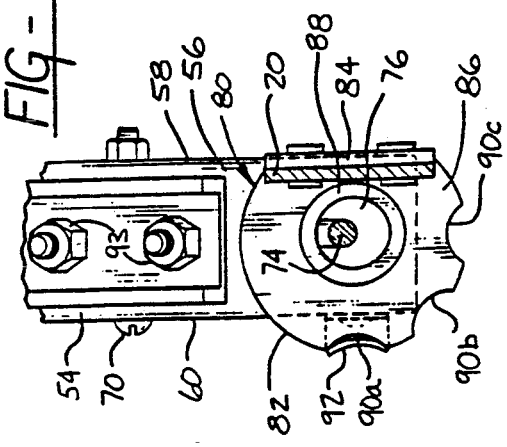
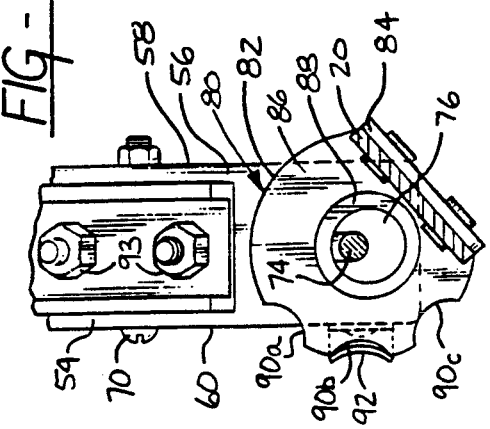
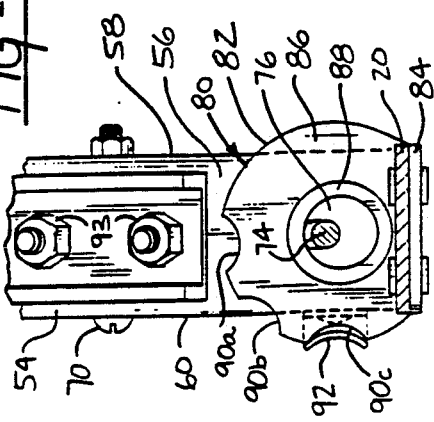

GRASS TRIMMING SHEARS

This invention relates generally to manually operated grass trimming shears.

BACKGROUND OF THE INVENTION

Various manually operated grass trimming shears have been proposed heretofore and are commercially available for trimming grass, weeds, and other plant life growing near the ground.

Typical of such grass shears is the type including a stationary blade coupled to a short handle. A movable blade is pivotally mounted on the stationary blade for selectively bringing associated cutting edges of the blades into moving point contact engagement with one another to effectuate shearing action of the blades. An actuating lever is mounted on a base of the handle and connected to the movable blade by a linkage such that when a user squeezes the lever toward the handle, the linkage transmits the pivoting motion of the lever to the movable blade causing the blade to pivot toward the stationary blade and cut any grass or weeds therebetween. Prior art shearing devices are also known in which the stationary blade is rotatable with respect to the support member and a releasable spring finger/detent latching mechanism provided for releasably locking the stationary blade in one of three cutting positions, namely a horizontal position, a vertical position, and an intermediate angled position.

All of such known prior art shearing devices, however, are difficult to use by individuals having back problems or those confined to a wheelchair since the short handle requires the user to bend in order to trim grass and weeds near the ground.

SUMMARY OF THE INVENTION

A manually operated hand tool for trimming grass, weeds, and the like, comprises a stationary blade operably coupled to a base member and presenting a cutting edge. A movable blade having a cooperating cutting edge is pivotally coupled to the stationary blade so that the cutting edges are supported in sliding point contact with one another to effectuate shearing action of the blades. A first lever is pivotally coupled to the base member and further connected to the movable blade by a first linkage for pivoting the movable blade in response to pivoting the lever. An elongate extension arm extends generally vertically upwardly from the base and supports a remote handle which can be grasped by the user while in an upright or seated position. A second remote actuating lever is spaced from the first lever and adjacent the handle and supported for pivotal movement with respect to the handle. The second linkage extends between and interconnects the remote actuating lever and the first lever enabling the user of the tool to trim grass and other ground level plant life while in a standing position by squeezing the remote lever causing it to move pivotally toward the handle thereby effecting pivotal shearing action of the blades.

This invention advantageously allows persons to trim grass and the like growing near the ground who are unable or prefer not to bend over when performing such task.

THE DRAWINGS

Apparatus constructed according to the invention is illustrated in the accompanying drawings, in which:

FIG. 1 is an elevation side view of the grass shear tool;

FIG. 2 is a sectional view taken along the line 2—2 of FIG. 1;

FIG. 3 is a sectional view taken along the line 3—3 of FIG. 2;

FIG. 4 is an enlarged sectional view taken along the line 4—4 of FIG. 2;

FIG. 5 is a sectional view taken along the line 5—5 of FIG. 2;

FIG. 6 is a sectional view taken along the line 6—6 of FIG. 3 showing the blades in a horizontal position;

FIG. 7 is a view like FIG. 6 but showing the blades rotated to a 45° angled position;

FIG. 8 is a view like FIG. 6 but showing the blades rotated to a vertical position;

FIG. 9 is an enlarged, fragmentary sectional view taken along the line 9—9 of FIG. 1; and FIG. 10 is an enlarged fragmentary sectional view taken along the line 10—10 of FIG. 1.

DETAILED DESCRIPTION

A manually operated grass shears hand tool constructed according to a presently preferred embodiment of the invention is indicated generally at 10 in FIG. 1 and is useful for shearing grass, weeds, and the like growing near the surface of the ground.

The tool 10 includes a shearing mechanism 12 connected to an elongate extension arm 14 and operable remotely by a lever 16 enabling a user of the tool to trim ground level grass and the like while in an upright standing position, as will be explained in further detail below.

The shearing mechanism 12 includes a pair of generally flat, hardened steel upper and lower blades 18, 20 interconnected by pivot connection means 22 for enabling the blades 18, 20 to pivot relative to one another with scissors-like shearing action to bring corresponding adjacent sharpened cutting edges 24, 26 of the blades 18, 20 into sliding point contact with each other to shear any grass or weeds therebetween. The pivot connection means 22 comprises a pivot pin 28 fixed to the lower blade 20 and extending upwardly therefrom perpendicularly out of a plane of the blade 20 (as seen best in FIG. 4) through a slotted opening 30 in the upper blade 18 formed adjacent a back edge thereof.

As is shown best in FIG. 4, a generally U-shaped swing arm member 32 is operatively connected to the upper blade 18 and supported by the pivot pin 28 for pivotal movement thereabout. The swing arm 32 has a bottom leg portion 34 extending between the upper and lower blades 18, 20 and a top leg portion 36 spaced above the upper blade 18. The top and bottom leg portions have a pair of aligned apertures receiving pivot pin 28 and thereby enabling the swing arm 32 to swing about the pivot pin 28. An internally threaded nut 38 is received on the upper free end of the pivot pin 28 restraining the swing arm 32 against axial movement along the pivot pin 28.

A mounting bracket 40 is secured to the upper blade 18 by rivets 42 or other suitable fasteners and includes a pair of rearwardly extending connecting arms 44 hinged to a corresponding pair of mounting tabs 46 of the swing arm member 32 by a hinge pin 48 extending perpendicular to the pivot pin axis. The hinged connection supports the rear edge of the upper blade 18 spaced above the lower blade 20 and further enables the upper blade 18 to pivot about the hinge pin axis relative to the plane of the lower blade 20. A compression spring 50 reacts between the top leg 36 of the swing arm 32 and the upper blade 18 and biases the upper blade 18 pivotally downwardly about the hinge axis so as continuously to angle the upper blade 18 downwardly with respect to the lower blade 20 and thereby maintain the cutting edges 24, 26 of the blades 18, 20 in sliding point contact with one another throughout shearing movement of the upper blade 18 about the pivot axis of pin 28. The spring 50 is kept in place by a retaining stud 52 and the head of one of the rivets 42.

The shearing mechanism 12 is supported by a rigid base member 54 having a generally U-shaped cross section and including an upstanding front connecting wall 56 integrally joining a pair of spaced apart left and right parallel side walls 58, 60. A first lever 62 is also generally U-shaped in cross section and includes a bottom connecting wall 64 and a pair of upstanding generally parallel left and right side walls 66, 68 which are spaced apart and accommodated between the side walls 58, 60 of the base member 54. Each pair of side walls 58, 60 and 66, 68 includes aligned apertures through which a pivot pin 70 extends for coupling the lever 62 pivotally to the base 54.

A cylindrical barrel member 72 extends between and is connected to the side walls 66, 68 of the lever 62 below the pivot pin 70. An internally threaded aperture extends transversely through the barrel member 72 and threadedly receives one end of a rigid control rod 74. The rod 74 extends forwardly of the barrel 72 in generally parallel relation to the plane of the lower blade 20 through an annular opening 76 formed in the front wall 56 of the base member 54. The opposite end of the rod 74 is connected to a side projection 78 of the upper blade at a location spaced from the pivot pin 28. The rod 74 serves to transmit the pivotal movements of the lever 62 directly to the upper blade 18 causing the blade 18 to pivot about pin 28 between open and closed positions.

The connection between the shearing mechanism 12 and base 54 is more specifically provided by rotatable mounting means 80 comprising an L-shaped plate member 82 having a forwardly extending leg portion 84 underlying the lower blade 20 and secured thereto by rivets or other suitable fastening means. An upstanding latching plate 86 is coupled to the front wall 56 of the base 54 by an annular sleeve 88 accommodated in the opening 76 of the front wall 56. The sleeve 88 secures the plate member 82 and shearing mechanism 12 against separation from the base 54 but enables bodily rotation of the plate member and shearing mechanism relative to the base member 54 about a central axis of the opening 76 to achieve angular adjustment of the position of the blades 18, 20 relative to the base 54. The latching plate 86 is formed with a plurality of circumferentially spaced detents or notches 90a, 90b, 90c which cooperate with a retaining spring finger 92 secured to and extending forwardly of the base 54 for removably latching the plate member 82, and hence the blades 18, 20, in a selected one of a plurality of angularly adjusted positions. As is best shown in FIGS. 6-8, there preferably are three such notches 90a, 90b, 90c arranged at about 45° increments to support the blades 18, 20 in a generally horizontal position (FIG. 6), in a generally vertical position (FIG. 8), and in a 45° angled position (FIG. 7). The blades may be positioned in any selected one of these positions by cautiously grasping the blades 18, 20 when closed and rotating the shearing mechanism 12.

The extension arm 14 is a rigid member having a lower end thereof attached to the front wall 56 of the base member 54 by fasteners 93 at a level above that of the adjustment plate 82. From its connection at the base 54, the arm 14 extends upwardly and angles slightly rearwardly to a distal upper end where a support handle 94 is provided. The handle 94 may be gripped by the hand of the user while standing upright, thereby enabling the user to position the blades 18, 20 near the ground without requiring the user to bend at the waist or knees. The extension arm 14 serves to link or connect the remote handle 94 rigidly to the base 54. It is preferred that the extension arm 14 and handle 94 be integral and formed out of a single piece of extruded aluminum bar stock material having a U-shaped transverse cross section defined by a pair of spaced apart parallel side walls 96 which are joined by a connecting wall 98. The handle 94 is formed by bending the arm 14 rearwardly so as to be generally parallel with the blades 18, 20. A foam rubber sleeve 100 may be slid over the free end of the handle 94 to provide a comfortable gripping surface for the handle 94.

The remote actuating lever 16 is below and adjacent the handle 94 and supported for pivotal movement with respect to the handle 94. The handle 94 has one end thereof secured pivotally to the extension arm 14. The secured end has a pair of spaced apart leg portions 104 straddling the opposite side walls 96 of the extension arm 14. The leg portions 104 and side walls 96 are formed with aligned apertures through which extends another pivot connection pin 106 enabling the lever 16 to pivot toward and away from the handle 94. A foam rubber sleeve or grip 107 is slid over a free end of the lever 16 to provide a comfortable gripping surface.

A second linkage member 108 extends between and operatively interconnects the remote lever 16 and the first lever 62 so that pivotal movement of the remote lever 16 causes corresponding pivotal movement of the first lever 62 and shearing action of the blades 18, 20. The linkage member 108 preferably is a rigid rod fabricated from cylindrical metal rod material and extends generally parallel to the extension arm 14. The rod 108 has opposite upper and lower ends which are bent to form a loop or eye 110, 112. The first lever 62 has a connecting pin 114 extending between and secured to the side walls 66, 68 of the lever 62 at a location spaced from the pivot connection 70 joining the lever 62 to the base 54. The connecting pin 114 extends through the lower end eye 112 of the rod 108 and establishes a rotatable connection therebetween. The remote lever 16 has a connecting pin 115 extending between and secured to the leg portions 104 of the lever 16 and spaced from the pivot pin 106. The connecting pin 114 extends through the eye 110 formed on the upper end of the rod to establish a rotatable connection between the rod 108 and remote lever 16.

A return spring 116 is provided for continuously biasing the blades 18, 20 pivotally apart to the open position shown in FIG. 2. The spring 116 preferably comprises a torsion spring having a central coiled portion supported on the pivot pin 70 and a pair of leg portions reacting against the extension arm 14 and the first lever 62 in compression, biasing the lever 62 downwardly and normally forcing the blades 18, 20 apart. When it is desired to trim grass or weeds, the user simply grasps the handle 94 and remote lever 16 with one hand and applies a squeezing force to the lever 16 sufficient to overcome the force of the spring 116 and force the lever 16 to pivot toward the handle 94 and cause the blades 18, 20 to close with shearing action thereby trimming any grass or weeds lying therebetween. Releasing the squeezing force on the lever 16 enables the spring 116 to return the blades to the open position.

The shearing tool 10 also may be provided with a supplemental handle 118 mounted on the extension arm 14 below the support handle 94 which the user may grasp with his other hand during operation of the shearing tool 10 for additional support and control. The supplemental handle 118 is shown best in FIG. 10 and comprises a generally rectangular member having a pair of spaced apart leg portions 120 straddling the opposite side walls 96 of the extension arm 14. The leg portions 120 include two sets of aligned apertures receiving a corresponding pair of fasteners 122 on opposing front and back sides of the extension arm 14 which forcibly urge the leg portions 120 firmly against the extension arm 14 to secure the supplemental handle 118 against movement on the arm 14.

The disclosed embodiment is representative of the preferred form of the invention, but is intended to be illustrative rather than definitive thereof. The invention is defined in the claims.

I claim:

1. A manually operated tool assembly for trimming grass and weeds, said assembly comprising:
   a base member;
   a stationary blade operatively coupled to said base member and including a cutting edge;
   a movable blade having a cooperating cutting edge and being pivotally coupled to said stationary blade so that said cutting edges are supported in sliding point contact with one another during pivotal movement of said blades to effectuate shearing action of the blades;
   a first lever pivotally coupled to said base member;
   a first linkage extending between and operatively interconnecting said movable blade and said lever;
   a support handle spaced from said base member;
   an elongate extension arm extending between and interconnecting said handle and said base member;
   a remote actuating lever spaced from said first lever adjacent said handle and supported for pivotal movement with respect to said handle;
   a second linkage extending between and interconnecting said remote actuating lever and said first lever, thereby enabling a user of said assembly to trim grass and other vegetation near ground level while standing in an upright position by grasping said handle and remote lever with one hand and squeezing said remote lever pivotally toward said handle to cause corresponding pivotal movement of said first lever and shearing action of said blades; and
   a supplemental handle mounted on said extension arm at a level spaced from said support handle for grasping by the other hand of the user, said supplemental handle having a pair of spaced apart leg portions straddling said extension arm, said leg portions having two paris of apertures aligned on opposing front and back sides of said extension arm, and a pair of fastener members extending through said pairs of aligned apertures and forcibly urging said leg portions against said extension arm to secure said supplemental handle against movement along said extension arm.

2. The assembly set forth in claim 1 wherein said remote actuating lever is pivotally coupled to said extension arm.

3. The assembly set forth in claim 2 wherein said second linkage comprises a rigid rod extending generally parallel to said extension arm.

4. The assembly set forth in claim 3 wherein opposite ends of said rod each include an eye and said remote actuating lever and said first lever each include a connecting pin extending through the respective eyes.

5. The assembly set forth in claim 4 wherein said remote actuating lever includes a pair of spaced apart leg portions straddling opposite sides of said extension arm, said leg portions and said extension arm including aligned apertures, and a pivot pin extending through said apertures and pivotally connecting said lever to said extension arm.

6. The assembly set forth in claim 5 wherein said extension arm has a generally U-shaped transverse cross section.

7. The assembly set forth in claim 6 wherein said handle comprises an integral portion of said extension arm.

8. The assembly set forth in claim 1 including a blade return spring reacting between said extension arm and said first lever for constantly urging said blades apart.

9. The assembly set forth in claim 1 including rotatable mounting means coupling said blades to said base member for conjoint rotation of said blades relative to said base member.

10. The assembly set forth in claim 9 including releasable latch means reacting between said base member and said rotatable mounting means for releasably latching said blades in any selected one of a plurality of angularly adjusted positions.

* * * * *